(12) United States Patent
Hellman et al.

(10) Patent No.: US 6,850,669 B2
(45) Date of Patent: Feb. 1, 2005

(54) PACKAGE FOR OPTICAL FILTER DEVICE

(75) Inventors: Scott M. Hellman, Aliso Viejo, CA (US); Paul A. Townley-Smith, Irvine, CA (US); Michael Ushinsky, Irvine, CA (US)

(73) Assignee: Avanex Corporation, Fremont, CA (US)

( * ) Notice: Subject to any disclaimer, the term of this patent is extended or adjusted under 35 U.S.C. 154(b) by 120 days.

(21) Appl. No.: 10/284,814

(22) Filed: Oct. 31, 2002

(65) Prior Publication Data

US 2004/0086226 A1 May 6, 2004

(51) Int. Cl.[7] ............................................. G02B 6/32
(52) U.S. Cl. ........................... 385/33; 385/16; 385/34; 385/74
(58) Field of Search ............................. 385/14, 16, 24, 385/27, 31–37, 39, 43, 47, 74, 88–93

(56) References Cited

U.S. PATENT DOCUMENTS

| | | |
|---|---|---|
| 4,230,924 A | 10/1980 | Brastad et al. |
| 4,267,420 A | 5/1981 | Brastad |
| 4,481,023 A | 11/1984 | Marechal et al. |
| 4,883,528 A | 11/1989 | Carpenter et al. |
| 5,631,991 A | 5/1997 | Cohen et al. |
| 5,969,862 A | 10/1999 | Maruyama |
| 6,002,524 A | 12/1999 | Schubert |
| 6,034,821 A | 3/2000 | Schenfeld et al. |
| 6,059,462 A | 5/2000 | Finak et al. |
| 6,185,347 B1 | 2/2001 | Zheng ........................ 385/34 |
| 6,246,813 B1 | 6/2001 | Zheng |
| 6,253,004 B1 | 6/2001 | Lee et al. |
| 6,282,339 B1 | 8/2001 | Zheng ........................ 385/34 |
| 6,284,085 B1 | 9/2001 | Gwo |
| 6,343,166 B1 | 1/2002 | Hellman et al. ............... 385/31 |
| 6,416,237 B2 | 7/2002 | Lissotschenko et al. |

OTHER PUBLICATIONS

Inorg. Chem. 2000, vol. 39, pp. 899–905, "Catalysis of the Silica Sol–Gel Process by Divalent Transition Metal Bis(acetylacetonate) Complexes".
Proceedings, IEEE, ECTC, 2000 ."Comparison of Active and Passive Fiber Alignment Techniques for Multimode Laser Pigtailing".
Patent application 10/284,941, Filed Oct. 31, 2002, "Microwave Assisted Bonding Method and Joint".
www.nasatech.com/Briefs/May01/NPO20608.html.
Passive Alignment. www.boraoptical.co.kr/technology_e.html.

*Primary Examiner*—Phan T. H. Palmer
(74) *Attorney, Agent, or Firm*—Moser, Patterson & Sheridan, L.L.

(57) ABSTRACT

An optical assembly includes a lens unit having a first lens and a second lens arranged on a common optical path with substantially coincident optical axes. Each lens has a transmission region through which light passes from a first side to a second side of the lens, and a first and a second table region on the periphery of the transmission region. The table regions are flat surfaces positioned on the first and second sides of each lens. An optical element holding tube is butt-coupled to the first table region of the first lens. An optical element, such as a filter, is supported on the first element holding tube. A second lens support tube holds the first lens and the second lens at opposite ends, with the first element holding tube therebetween. The first and second lenses and the optical element are passively aligned and then fixed in place with optical adhesive at the butt joints.

17 Claims, 3 Drawing Sheets

PACKAGE FOR OPTICAL FILTER DEVICE

BACKGROUND OF THE INVENTION

1. Field of the Invention

The present invention relates generally to packaging for photonic devices and particularly to packaging for 2-, 3- and multiple-port optical devices such as WDM filters, and various crystal-based devices.

2. Technical Background

A typical WDM module includes numerous optical circuits arranged in parallel and in series to address a large number of channels. Each circuit is formed by a number of collimating and/or filtering-collimating assemblies, each including a 3-port filtering package that includes optical fibers inserted and bonded into glass ferrules to produce fiber-ferrule "pigtails," collimating lenses, and a spectral shaping thin film optical filter. In a typical 3-port package, the collimating lens receives the light emitted from the input fiber, collimates this light into parallel rays, and transmits them to the filter. The filter splits the collimated light into two separate beams, a transmitted beam and a reflected beam. The transmitted beam is then coupled into an output collimating assembly. The reflected beam is reflected and coupled into the adjacent reflective fiber.

To provide these operations between the filter and collimating assemblies, a tip-tilt or a translational active alignment of collimating and filter assemblies is used. The interrelationships between the assemblies that reflect the achieved optimum alignment is then locked in place using various bonding, soldering or welding encapsulation techniques. The filter price and the packaging costs are two dominating factors affecting the cost of the 3-port packages and WDM modules. Typical 3-port packages have used active alignment, reciprocally duplicating adhesive bonding and soldering encapsulation techniques involving several structural sub-components, for example, a pair of insulating tubes and several metal protective units per package. All this makes manufacturing of the packages time-consuming and expensive.

Examples of attempts to improve and simplify 3-port filtering packages, their assembly and encapsulation are found in, for example, U.S. Pat. No. 6,282,339 and U.S. Pat. No. 6,185,347, which show packages made from adhesively bonded and interrelated glass components and tubular glass holder units. With these designs the necessity of the soldering or welding encapsulation involving structural metal units is, therefore, eliminated from the packaging process. However, these packaging approaches still exhibit certain limitations. They require a great deal of active alignment, and the precision mechanical design of the butt joints. The rheology and the time-dependent degradation of epoxy adhesives located within the optical path of the package require different adhesive materials in various bonds used in the package. In assembly, a previously achieved precise active alignment can be easily harmed due to heat-cure assisted polymerization and the accompanying it thermal shrinkage in a subsequent step. In-situ heat cure fixing the active alignment steps requires, therefore, an alignment station that is able to retain the interrelationships between the aligned assemblies inside the package at elevated temperatures. Thus, in spite of the simplifications in the package design and manufacturing suggested in these references, the packaging process remains time-consuming and expensive. Therefore, a need still exists in the design and manufacturing of low-cost, viable, and reliable filter- or crystal-based packages that will be able to overcome the difficulties discussed above.

Thus, it would be desirable to have a filtering assembly for two-, three-, and higher port-count temperature-compensated optical filtering packages, which is simpler in construction, inexpensive in materials and manufacturing, and reliable in operations.

SUMMARY OF THE INVENTION

One aspect of the invention is an optical assembly that includes a lens unit having a first lens and a second lens arranged on a common optical path with substantially coincident optical axes. Each lens has a transmission region through which light passes from a first side to a second side of the lens, and a first and a second table region on the periphery of the transmission region. The table regions are flat surfaces positioned on the first and second sides of each lens. An optical element holding tube is butt-coupled to the first table region of the first lens. The butt joint formed includes a thin ring of adhesive that is external to all optical paths of the package. An optical element, such as a filter or crystal block, is supported on the end face of first element holding tube. A second lens support tube holds the first lens and the second lens at opposite ends, with the first element holding tube therebetween. The first and second lenses, and the said optical element are passively aligned and then fixed in place with an adhesive at the ring butt joints.

In another aspect, the present invention includes an optical assembly as described above, wherein the lenses, the element holding tube and the lens support tubes are formed of identical glass compositions (such as, for example, fused silica) or highly thermally compatible glass compositions. In another aspect, the glass compositions are at least partially transparent to UV radiation that will cure the adhesive(s).

In another aspect of the present invention, the lens support tube surrounds the lenses. In another aspect of the present invention, the optical assembly further includes an input assembly butt coupled to a first end of the lens support tube, and an output assembly butt coupled to the output end of the lens support tube.

In an alternate aspect of the present invention, opposing ends of the lens support tube abuts a table region on each of said first and said second lenses. In another aspect of this alternative, embodiment of the present invention, the optical assembly includes an input assembly butt coupled to a table region of said first lens, and an output assembly butt coupled to a table region of the second lens.

In an embodiment involving a 3-port device, the dual-fiber ferrule pigtail positioned inside the glass holding tube is aligned and then adhesively bonded to the end face of the input collimating lens, while the single fiber-ferrule pigtail positioned inside the glass holding tube is aligned and then bonded to the end face of the output collimating lens. The simplified alignment operations include translational (lateral) iterative steps minimizing the insertion losses in the reflected and transmitted optical signals. The obtained optimum interrelationships between input, output and filtering-collimating assemblies are then adhesively secured. A heat or UV curable epoxy adhesive is used. Two butt joints formed are thin rings of adhesive that are also external to all optical paths of the package.

Structurally, the packaged system is a stepped cylindrical beam. Optimizing the structural dimensions of the supporting glass tubes, one can design a package of equal strength (resistance) in all cross-sections of the packages. This additionally minimizes the stress levels in structural and optical elements as well as in bond layers and therefore improves optical performance of the package due to possible mechanical and environmental excitations (loads).

The present invention provides a filtering-collimating optical assembly that may be fashioned in a manner that is fully passively aligned, with little or no need for active alignment. The present invention can provide an adhesively bonded optical assembly for two-port, three-port, and higher port-count temperature-compensated optical filtering packages used in dense wavelength-division multiplexing (DWDM) modules, or polarization-beam combiner-splitters and isolators. With this assembly, the role of active alignment in the manufacturing of various packages and modules can be minimized or even eliminated and replaced by semi-automated passive alignment. The optical sub-components may be designed to be coupled together in modular fashion to form an optical assembly that can be applicable to various networking devices.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description present embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention, and together with the description serve to explain the principles and operations of the invention.

DETAILED DESCRIPTION OF THE PREFERRED EMBODIMENTS

Figure 1:
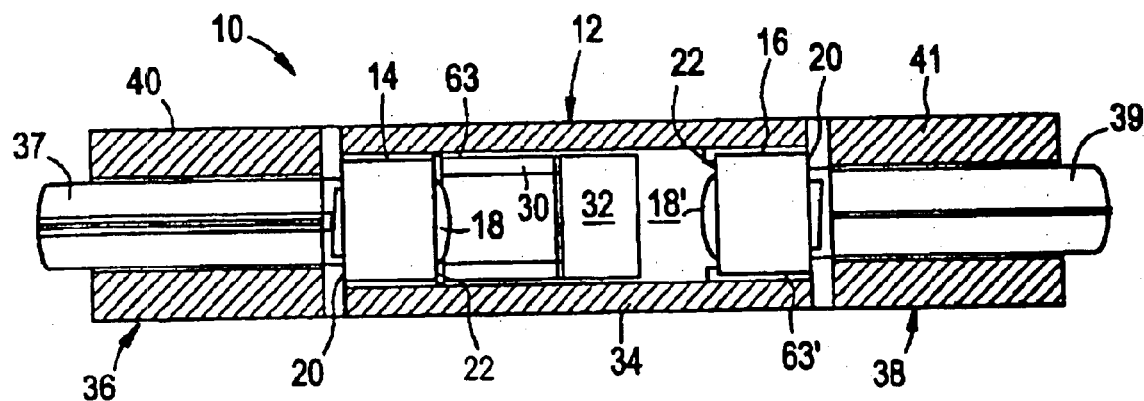
FIG. 1 is a cross sectional side view of a 3-port thin film filter package optical assembly according to an embodiment of the invention.

Reference will now be made in detail to the present preferred embodiments of the invention, examples of which are illustrated in the accompanying drawings. Whenever possible, the same reference numerals will be used throughout the drawings to refer to the same or like parts. One embodiment of the optical assembly of the present invention is shown in FIG. 1, and is designated generally throughout by the reference numeral 10.

As embodied herein and depicted in FIG. 1, an optical assembly such as the illustrated 3-port thin film filter package 10, includes a central unit 12 having a first lens 14 and a second lens 16 arranged on a common optical path, preferably with substantially coincident optical axes. Each of the lenses 14, 16 has a central transmission region with a convex aspheric segment 18, 18' through which light passes from a first side to a second side of the lens, and a first 22 and a second 20 table ring region on the periphery of the transmission region. Suitable lenses are described in detail below.

Figure 2:
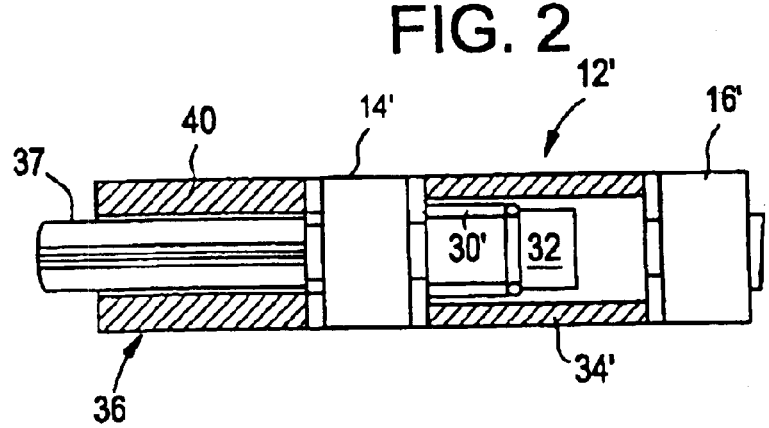
FIG. 2 is a cross sectional side view of a 3-port thin film filter package optical assembly according to an alternative embodiment of the invention.

The central unit 12 includes a first support glass tube or optical element holder 30 which is butt-coupled to the first table region 22 of the first lens 14. An optical element 32, such as a thin film filter, is supported on the element holder 30. The optical element 30 could be another kind of element such as, for example, an adhesively bonded pair of birefringent crystals (such as $YVO_4$) making up a polarization beam splitter combiner, an isolation care block, or other crystal-based element. The selected glasses of holder 30 and the substrate of filter 32 or crystal are either identical (fused silica, for example) or highly thermally compatible. When the element 32 is referred to as a filter, it is for illustrative purposes only. The lens support tube 34 holds the first lens 14 and the second lens 16 at opposite ends, with the element holder 30 and element 32. The first and second lenses 14, 16, and the optical element 32 are passively aligned and then fixed in place with an optical adhesive at the butt joints, in a process described in detail below. An input dual-fiber assembly 36 and an output single-fiber assembly 38, each of which includes a pigtail made up of fibers inserted in and adhesively secured and supported within capillaries of the said ferrules, are butt-coupled to the central unit 12. Although dual-fiber and single-fiber assemblies are illustrated, other fiber counts such as four-fiber and dual-fiber assemblies, may be used when higher port counts are desired. The adhesive, preferably epoxy, fills the lateral gap between the ferrules 36 and 37 and the surrounding them tubes 40 and 41 and produces a thin ring layer in the butt joints with the central unit 12. In the embodiment illustrated in FIG. 1, the lens support tube 34 surrounds the annular sides of the lenses 14, 16. In this embodiment, the adhesive ring layers cover the end face surfaces of the tubes 34, 40, and 41, lenses 14 and 16, and ferrules 37 and 39, except the light receivers 28 of the lenses and the reciprocal that are located at the end faces of ferrules 37 and 39 in the proximity of the fiber capillary (s). In an the alternative embodiment shown in FIG. 2 a central unit 12' includes, a support tube 34' which holds lenses 14', 16' at opposite ends, with the ends of the tube 34' butt-coupled to facing table regions of the two lenses 14', 16'. In this embodiment, the adhesive ring layers cover the end face surfaces of the tubes 34, 40, and 41, larger lenses' 14 and 16', and ferrules 37 and 39, except the light receivers 28 of the lenses and the reciprocal that are located at the end faces of ferrules 37 and 39 in the proximity of the fiber capillarys. An element holder tube 30 supports an optical element 32' in a manner similar to the FIG. 1 embodiment.

In the case of another alternative embodiment, the input and output lenses may be laterally offset with respect to each other to additionally minimize, when necessary or desirable, the insertion losses in optical paths and optimize the package optical performance. Typically the required offsets are small and within 50–75 micron level, so the illustrated opto-mechanical design of the package with large lenses easily provides this additional performance capability. With these small offsets the package structural performance remains essentially the same.

The dimensional parameters of the central unit 12 can be easily established by ones skilled in the opto-mechanical design of micro-optic systems. The design considerations include the optical and mechanical parameters of the lens 14 and 16 (or 14' and 16'), thin film filter 32 (or crystal), such as lens focal distances, focusing factor of the filter film coatings, as well as structural dimensions and manufacturing tolerances of all the said components and adhesive layers, so the optimum length of the glass holder 30 can be established with a high accuracy and in advance. In the FIG. 1 embodiment, where the optical element 32 is a bulk thin film filter with dimensions of about 1.4×1.4×1.5 mm, the length of each lens 14, 16 would preferably be about 3 mm and the length of the element holder 30 would be about 2 mm. With these dimensions the total length of the central unit 12 would be about 10 mm. These dimensions can be defined more precisely for the particular package and optical components desired.

Figure 3:
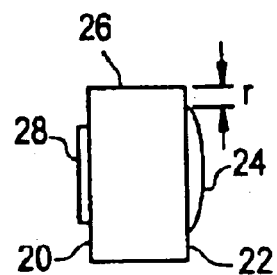
FIG. 3 is a cross sectional side view of a molded collimating lens.

Referring now to FIG. 3, each of the lenses 14, 16, (or 14', 16' for the FIG. 2 embodiment) is preferably a glass molded collimating lens. A lens suitable for use in the illustrated embodiments includes an aspheric central segment 24 located at the lens front face and annular rings 26 which form shoulders or flanges which surround this segment and act as table regions 20 and 22 capable of supporting other structural elements and acting as reference planes for assembly. The shoulder 26 preferably has highly parallel and flat front and back faces forming the table regions. The lens has a rear surface receiver 28, preferably having approximately an 8° angle polished facet. The optimum facet angle will depend upon the refractive index of the lens material, with higher index requiring smaller facet angle. Materials suitable for use in these lenses may be chosen from a variety of typically low melting temperature, well forming materials, such as, for example, SF 57, TaC 4, fused silica or other suitable glasses. These glasses are desirable because they are characterized by low to moderate thermal expansion coefficients and also are partially UV transparent. It is desirable that the surfaces forming the table regions have a flatness of at least 0.02% and be within 10 arcseconds of perpendicularity to the optical axis of the lens. The desired degree of flatness and parallelism of the opposing faces of the ring shoulder can be achieved by conventional compression molding processes. The shoulder rings 26 have radial dimensions which are sufficiently wide to support a tubular element such as an element holder 30 in the FIG. 1 embodiment or both a lens holding tube 34' and an element holder 30' lying within it, as in the FIG. 2 embodiment.

Figure 4:
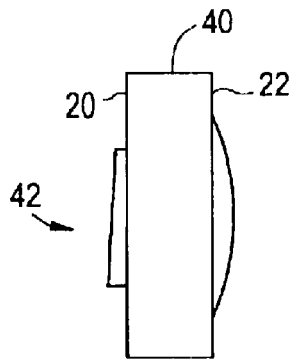
FIGS. 4, 5 and 6 are cross sectional side views of various alternatives of molded collimating lenses.
Figure 5:
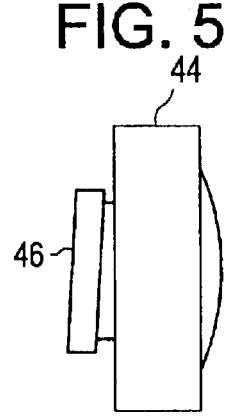
Figure 6:
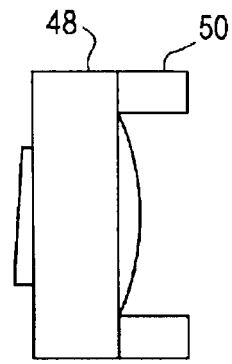

FIGS. 4, 5 and 6 illustrate various alternative configurations of back receivers, which incorporate a male-female precision mechanical joint. The lens 40 shown in FIG. 4 includes a female receiver 42. The lens 44 shown in FIG. 5 is equipped with a separate disk 46 receiver that is bonded to a back side of the lens 44. The lens 48 shown in FIG. 6 includes a molded tubular element holder 50. A filter or other optical element can be attached to this holder 50 which is integral with the table region of the front face of the lens 48. In all designs the shoulders and end face of the holder may, if desired, be equipped with self-centering features such as molded male-female ring flanges, self-guiding pins and grooves, etc. The back side receiver forms a stepped surface that in addition to its mechanical features can be designed so as to correct possible chromatic aberration. Moreover, the molded lenses having at least two stepped ring segments of the type shown in FIG. 5, are known as the aberration correcting elements themselves. Thus, the above-described mechanical features improve the optical performance of the assembly as well.

In a preferred embodiment, both collimating lenses are characterized by substantially identical optical and structural parameters. However, when required, for example to compensate the film focusing effect associated with deposition of the plurality of the refractive/reflective thin films on the thermally mismatched glass substrate when manufacturing 100 GHz or even 50 GHz filters, lenses with different optical parameters may be used. To take in account this effect, the curvature of aspheric central segment 24 located at the lens front face can be easily corrected and implemented in mold, while dimensional parameters of the segment, such as plane radius and axial protrusion, remain the same. In such a case identical or highly similar structural parameters, such as general dimensions, dimensions of the shoulders and molding tolerances, may still be desirable.

In a preferred embodiment, both of the lenses, the filter substrate, and the tubular units are made from the same or from closely thermally matched glass materials, so that thermally induced mismatch stresses in the adherent components can be minimized. This also reduces the stress in the bond layers and minimizes the stress-induced birefringence (if any) in the assembled central unit. Glasses having a higher UV transparency are desirable to reduce the duration of the UV cure of an epoxy adhesive, as discussed, for example, in U.S. Pat. No. 6,343,166 which is hereby incorporated by reference herein in its entirety.

Figure 7A:
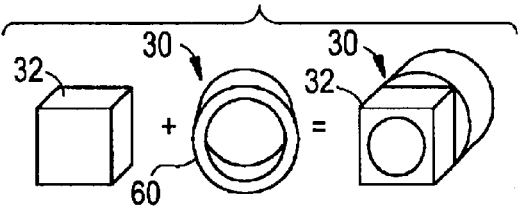
FIGS. 7a–7d are schematic illustrations of the assembling process for the central unit that is shown in FIG. 1 embodiment.
Figure 7B:
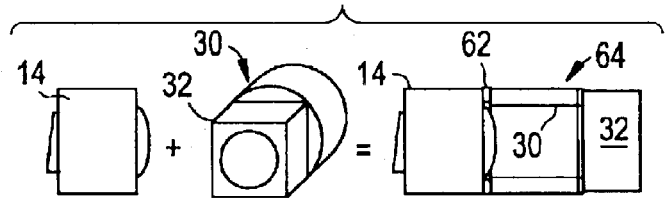
Figure 7C:
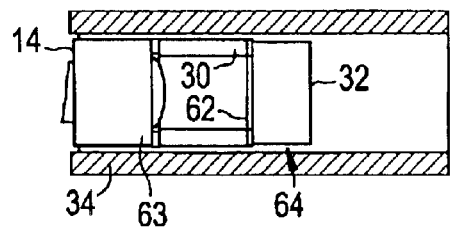
Figure 7D:
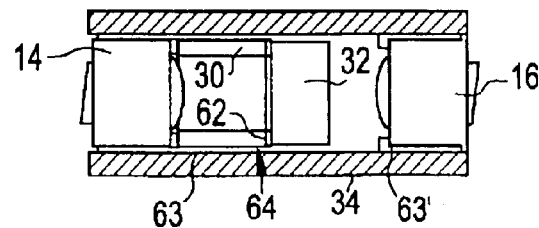

Referring now to FIGS. 7a–7d, a method for assembling an illustrative optical assembly is schematically represented. In the illustrated assembly process, an optical element such as a filter 32 is bonded to a tubular glass element holder 30 having an aperture 60. The first lens 14 is then bonded to this glass holder 30 on an end-face opposite the filter 32. Adhesive 62 is applied to the circumferential butt joint formed between the lens'table region 21 and the holder end-face and cured. The resulting bonded filtering-collimating block 64 shown in FIG. 7b is then inserted into the second glass tubular unit, the lens support tube 34 (see FIG. 7c). An adhesive is applied to the annular interface between the lens 14 and the tube 34 to create an adhesive bond 63. The adhesive may extend to the annular space between the element holder 30 and the tube 34. The second lens 16 is then inserted into and bonded with an annular adhesive bond 63' within the tube 34 at a predetermined distance from the block 64 (see FIG. 7d) and affixed to it with an annular adhesive bond 63. With the cured bonds the filter 32, holder 30, lenses 14 and 16 and a tube 34 form a 3-dimensional inextricably entwined and structurally integrated frame having high flexural rigidity. This high flexural rigidity is due to the suggested structural design of the central unit. The two lenses are rigid discs or short cylinders that provide high stiffness of the assembly in the radial direction. The holder and tube provide high stiffness of the assembly in the axial direction. When structurally integrated in the central unit this disc/tube frame is capable to withstand to various mechanical and thermal loads. With its circumferential (ring) bond layers the frame easily retains its axial and radial symmetry even in the case of the environmental degradation of the adhesive.

Two illustrative adhesive application methods will be described. In the case of a adhesive having a high viscosity (for example, more than 10,000 cPs), for example EPOTEK 353NDT, the adhesive drops of about 0.25 mm diameter are positioned and smeared at the filter-holder interface, so the adhesive layer formed will be as thin as 3–5 microns. When positioning the adhesive it will be evident to ones skilled in the field of micro-optic packaging to prevent the contamination of the optical path by using in-situ microscopy control. In the case of low or moderate viscosity adhesives (for example, less than 5000 or 7000 cPs) the capillary action of the adhesive (such as EPOTEK 353ND) can be used instead. In this case the filter 32 is positioned on the end face of the holder 30. Four drops of adhesive (about 0.25 mm diameter) are positioned at the periphery of the filter corners. With a very thin gap formed (typically under 2 microns), the high surface tension at the filter (or crystal)/holder interface leads to a capillary action of the adhesive that uniformly covers the said interface with the adhesive film. The capillary action automatically arrests any excessive propagation of the adhesive inside the holder. The forces of surface tension acting in this gap (capillary action) also controls and minimizes the thickness of the adhesive layer. In the case of crystal-based devices the second method is highly affected by the surface properties of the crystal used. For example, the interface between 7740 borosilicate glass and the polished YVO4 prism effectively accelerate the capillary action and bond formation.

In both of the illustrated embodiments, the adhesive used in the bonds may all be a UV/thermally curable or a thermally curable epoxy adhesive. Thermally curable or UV tackable and thermally curable epoxies such as EPO-TEK 353ND, EPO-TEK 353NDT, EPO-TEK OG 142 or Master-Bond UV15 or MasterBond UV 15×2 or similar epoxy materials can be used in the bonds 62, 63 and 63'. The bonding may utilize the capillary action of the adhesive at the interfaces. Adhesives having high Young's modulus (E>100,000 psi), moisture-resistance, and moderate-to-high thermal-expansion coefficient (for example, a range of $\alpha=40\times10^{-6\circ}$ C.$^{-1}$ to $50\times10^{-6\circ}$ C.$^{-1}$), such as, for example, EPO-TEK 353ND, are particularly well suited for this use.

When an UV/heat curable epoxy containing UV- and heat-sensitive curing initiators is used, after UV exposure, the assembly maybe subjected to accelerated stress relaxation, which includes several short thermal cycles at a temperature not exceeding 50% of the minimum thermal-cure temperature. Then the assembly is subjected to a final thermal cure for about 1 hour at 110 to 115° C. The suggested cure temperatures reflect epoxy formulations similar in properties to 353ND and 353NDT EPO-TEK adhesives. It is desirable that the bond thickness be maintained and limited to about 6 to 10 microns.

A microwave-assisted bonding technique that may be used in the assembly and bonding of the present invention is described in detail in a co-owned U.S. patent application Ser. No. 10/284,941 filed on even date herewith, entitled Microwave Assisted Bonding Method And Joint, which is hereby incorporated by reference in its entirety as if fully set forth herein.

In alternative embodiments, an anodic or chemical bonding process can be used for integration of subcomponents and holding units. A suitable anodic bonding is a catalytically activated sol-gel process described in, for instance, Mayo E. I., Poore D. D., and Stiegman A. E. "Catalysis of the Silica Sol-gel Process by Divalent Transition Metal Bis (acetylacetonate) Complexes" Inorg. Chem. 2000, 39, 899–905, which is hereby incorporated by reference. In the case of well thermally matched assemblies, the sol gel process forms reliable and precision joints, but requires a wet chemistry assembly station and clean-room environment.

Chemical bonding typically involves hydroxide-catalyzed hydration-dehydration processes, and provides highly reliable joints between structural elements made of silica-based or silica-contained glasses. As in the case of anodic bonding, the fabrication requires a wet chemistry assembly station. In both these processes, when this fabrication step can be combined with the glass molding, manufacturing of the illustrated assembly can be performed in a costeffective manner.

Figure 8A:
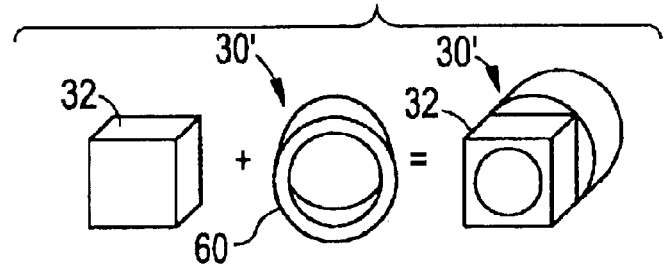
FIGS. 8a–8c are schematic illustrations of the assembling process for the central unit that is shown in FIG. 2 embodiment.
Figure 8B:
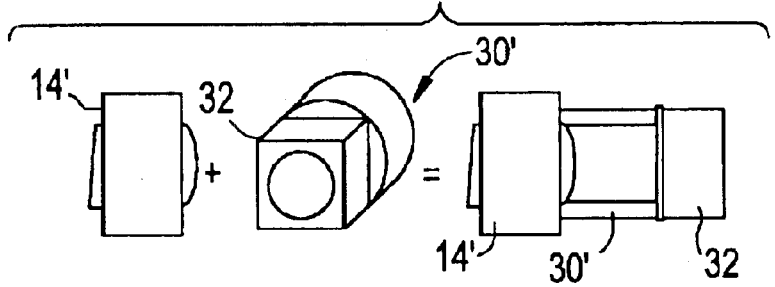
Figure 8C:
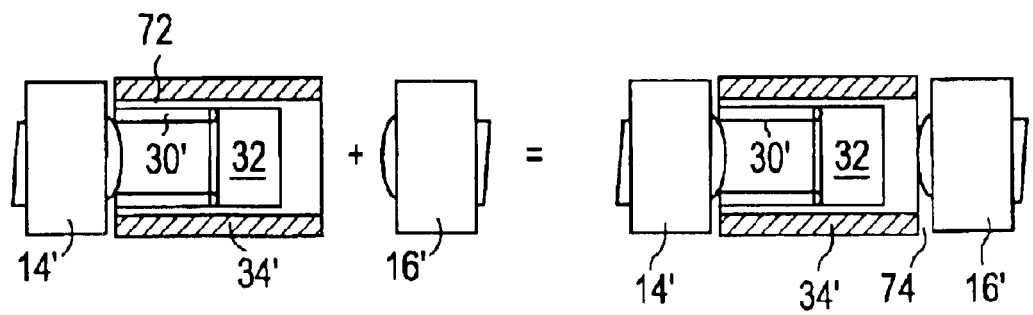

The assembling process for the second embodiment of the central unit 12' is illustrated in FIGS. 8a–8c. This design uses lenses 14', 16' having a larger aspect ratio and wider table regions 20', 21' than the lenses used in the FIG. 1 embodiment. First, the filter 32 is positioned and bonded on the end face of the thermally matched glass holder 30' with an aperture 60 as shown in FIG. 8a. For a 1.4×1.4×1.5 mm filter, the outer diameter and the aperture of this holder 30' are preferably about 2 mm, and 1 to 1.2 mm, respectively. Then, the first lens 14' is bonded with this holder as shown in FIG. 8b. The formed filtering-collimating block is then inserted into the glass tube 34', as shown in FIG. 8c, and adhesively bonded at the annular interface 72 between holder 30' and tube 34'. The second lens 16' is then aligned with and bonded to the tube 34', with a ring bond 74 between the lens' table region and the tube's end face.

In both designs all the fabrication steps for the central lens unit can be accomplished using only passive alignment operations. These operations can be semi-automated using multi-layered jig frames such as those discussed in Karioja, P., et. al. "Comparison of Active and Passive Fiber Alignment Techniques for Multimode Laser Pigtailing" in Proceedings, IEEE, ECTC, 2000 which is incorporated herein by reference. Micromachining techniques can be used to fabricate the alignment-sensitive parts of these jigs. The passive alignment criteria may include an evaluation of the original spectral performance and corresponding angle of incidence (AOI) of the filter and lenses, and fiber-ferrules that optically match the filter AOI, and predetermined optimum distances between the frontal faces of the lenses and the filter. The suitable length of both holder units 30 and 30' and tubes 34 and 34' can be determined through engineering calculations, involving well established principles of optics, heat transfer analysis, mechanics of materials and dimensional tolerancing and correlating the obtained results with the empirical data, and optimized to provide these distances and targeting alignment for a set of components with their particular structural and optical irregularities and uncertainties.

Referring back to FIGS. 1 and 2, the central units 12, 12' then can be aligned with input dual- or multiple-port fiber-ferrule pigtails and output single-, dual- or multiple-port fiber-ferrule pigtails. In these fabrication steps, the central units and pigtails are mounted, actively aligned, and bonded to form the optical assembly 10 (or 10' in the FIG. 2 embodiment), so the transmitted and reflected light beams in all optical paths are collimated and insertion losses (IL) are minimized. The alignment operations include translational (lateral) iterative steps minimizing the insertion losses in the reflected and transmitted optical signals. The obtained optimum interrelationships between input, output and filtering-collimating assemblies are then adhesively secured. Heat curable, heat/UV curable or UV tackable and heat curable epoxies such as 353ND, 353NDT, OG 142 (all of EPO-TEK) or UV15 or UV 15x2 (MasterBond) or another similar epoxy materials can be used in these bonds. Two butt joints formed are thin rings of adhesive that are external to all optical paths of the package. In either embodiment, a smaller outer diameter dual-fiber ferrule 37 is inserted inside a glass tube 40 whose outer diameter is equal to the outer diameter of the central unit tube 34, 34'. The width of its annular side is greater than that of the tube 34 in the FIG. 1 embodiment, allowing it to be supported by both the tube 34 and the table region of the lens 14. In the FIG. 2 embodiment, the width of its annular wall is chosen so that its inner diameter is smaller than the outer diameter of the lens 14'.

In the illustrated embodiments, the input pigtail assembly 36 is a dual-fiber ferrule assembly and the output pigtail assembly 38 is a single-fiber ferrule assembly. The dual-fiber ferrule assembly 36 is aligned with the central unit 12 or 12' in the x- and y- directions (where the x-y plane is perpendicular to optical axis z of the assembly 10) and rotationally in the x-y plane, and bonded to the central unit with a ring-shaped adhesive face bond 42. Then the z-axial alignment is performed by moving the ferrule 37 axially within the tube 40 to optimize the RIL in the dual-fiber ferrule collimating and filtering assembly. Finally, the aligned system is in-situ secured (bonded) by curing the preliminary dispensed adhesive to retain the obtained interrelationships between the central and end units sub-assemblies. This provides the optimum coupling of light in all optical paths of the device, which is adhesively bonded at the targeted position.

When the central unit 12 is bonded to the dual fiber pigtail, then the single fiber pigtail assembly 38 can be mounted, actively aligned, and adhesively bonded as well. The single fiber pigtail includes the fiber-ferrule 39 that is inserted inside a tube 41 that, in the illustrated embodiment, is identical in dimension to the tube 40. The single-fiber ferrule assembly 38 is then aligned and bonded to the end-face of the central unit. The x-, y-lateral translation, in-plane rotation, and z-axial alignment operations are performed to find the interrelationships between the sub-assemblies in a position with a minimum transmission insertion loss (TIL). A ring-type face bond is used, like that used for the input ferrule.

The suggested design of the central unit, alignment, and packaging technique can be easily extended to the various two-, three-, and multiple-port temperature-compensated optical filtering packages used in dense wavelength-division multiplexing (DWDM) modules, or polarization beam combiner-splitters and isolators. In this case, the alignment and encapsulation techniques used for the manufacture of 3-port filtering packages can be extended for the packaging of the above-mentioned systems.

With the above-described opto-mechanical design, passive alignment of the central unit, and the only epoxy bonding encapsulation we can illuminate the soldering encapsulation, so more expensive assembly techniques such as soldering encapsulation, separate active and passive alignment procedures can be avoided, the role of active alignment can be minimized, and expensive insulating tubes and enclosure units can be eliminated. In the above described device the structural properties of optical components are fully utilized. This reduces the weight of the packages and, therefore, improves its dynamic response to the various vibrations, including the shock-excited ones. The stepped cylindrical package with the practically equal strengths in all its cross-sections optimizes (equalizes) the static and dynamic responses to possible lateral loads. This design additionally minimizes the bending stresses in structural and optical elements as well as the stresses in bond layers and therefore improves optical performance of the package. The assembly time for the module as well as the DWDM manufacturing and component costs also can be substantially reduced.

It will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

What is claimed is:

1. An optical assembly comprising:
   a lens unit comprising:
   a first lens and a second lens arranged on a common optical path with substantially coincident optical axes, each lens comprising:
   a transmission region through which light passes from a first side to a second side of the lens, and
   a first table region and a second table region on the periphery of the transmission region, said table regions comprising flat surfaces and positioned on a first and a second side of the lens;
   a first support tube butted to the first table region of the first lens;
   an optical element butted on said first support tube; and
   a second support tube holding the first lens and the second lens at opposite ends thereof, with the first support tube therebetween,
   said first and second lenses, and said optical element being passively aligned and fixed in place at the butt joints.

2. The optical assembly of claim 1, wherein said first and second lenses, said first and second support tubes comprise thermally compatible glass compositions.

3. The optical assembly of claim 2, wherein said glass compositions are transparent to radiation which will cure the adhesive.

4. The optical assembly of claim 3, wherein a table region of each of said first and said second lenses abuts an end of said second support tube.

5. The optical assembly of claim 4 wherein said first support tube is bonded to said second support tube in an annular region between said first and said second support tubes.

6. The optical assembly of claim 5 wherein said optical element is a filter.

7. The optical assembly of claim 3, wherein the second support tube surrounds said first and said second lenses.

8. The optical assembly of claim 7 wherein said first support tube is bonded to said second support tube in an annular region between said first and said second support tubes.

9. The optical assembly of claim 8 wherein said optical element is a filter.

10. The optical assembly of claim 7, further comprising an input ferrule butt coupled to a first end of the second support tube, and an output ferrule butt coupled to the output end of the second support tube.

11. The optical assembly of claim 3, further comprising an input ferrule butt coupled to a table region of said first lens, and an output ferrule butt coupled to a table region of said second lens.

12. The optical assembly of claim 1 wherein each of the first and the second lens is an aspheric molded lens.

13. The optical assembly of claim 1 further comprising a first fiber pigtail adhesively bonded to a first end of the lens unit, and a second fiber pigtail adhesively bonded to the second end of the lens unit.

14. A method of assembling an optical package comprising:

mounting an optical element on a first endface of a first tube;

mounting a first lens on a second endface of the first tube;

inserting the optical element and first tube into a second tube;

mounting the first lens to an end of the second tube; and mounting a second lens to the opposite end of the second tube.

15. The method of claim 14 further comprising passively optically aligning said first lens and said optical element.

16. The method of claim 15 wherein the mounting of the first lens and the second lens to endfaces of the second tube includes applying an adhesive at the joints between the first and second lens and the first and second endfaces, respectively, and curing said adhesive.

17. The method of claim 16 further comprising: aligning a fiber pigtail to each of the first and second lenses, and mounting the fiber pigtails thereto.

* * * * *